July 16, 1968 R. S. NEASHAM 3,392,645
SPECTRAL-ZONAL PHOTOGRAPHIC SYSTEM
Filed Nov. 29, 1965 11 Sheets-Sheet 1

INVENTOR
ROBERT S. NEASHAM

BY Claude Funkhouser ATTORNEY
Thomas H. Neff
AGENT

SIMPLE LENS

FIG. 6a

COMPLEX APROCROMATIC

FIG. 6b

FOURIER TRANSFORM

FIG. 6c

PLAN VIEW

FIG. 6d

SINE WAVE RESPONSE

FIG. 6e

PROPOSED SYSTEM

FIG. 8a  MULTI BANDWIDTH RECONNAISSANCE

TRI STIMULUS RESPONSE OF THE HUMAN EYE

FIG. 8b

TYPICAL COLOR RESPONSE OF FILM

FIG. 8c

TYPICAL INTERFERENCE FILTER RANGE INDICATING TRANSMISSION CUT-OFF

FIG. 8d

SPECTROPHOTOMETRIC RESPONSE CURVE

FOR ANY POINT +

HIGH RESOLUTION BLACK & WHITE    $\sqrt{9}$ = 3X RESOLUTION + ACUTEANCE

ELONGATION REPRESENTS ORIENTATION OF MAJOR EDGE GRADIENTS, CENTER REPRESENTS POINT ON NUMBER LINE FOR CYCLES/mm x DISTANCE INCREASE = INCREASE IN cy/mm

PROCESSING FLOW PLAN

FIG. 24

July 16, 1968  R. S. NEASHAM  3,392,645
SPECTRAL-ZONAL PHOTOGRAPHIC SYSTEM
Filed Nov. 29, 1965  11 Sheets-Sheet 11

FIG. 25

United States Patent Office 3,392,645
Patented July 16, 1968

3,392,645
SPECTRAL-ZONAL PHOTOGRAPHIC SYSTEM
Robert Stevenson Neasham, 1910 W. Surrey Ave.,
Phoenix, Ariz. 85029
Filed Nov. 29, 1965, Ser. No. 510,739
6 Claims. (Cl. 95—12.5)

ABSTRACT OF THE DISCLOSURE

An improved camera system for obtaining accurate data from a photographic medium. A plurality of cameras are used, each calibrated to a filter and a short focal lens to be used in a very narrow bandwidth of light ranging from ultra-violet to infra-red, to provide increased resolution.

---

The invention described herein may be manufactured and used by or for the Government of the United States of America for governmental purposes without the payment of any royalties thereon or therefor.

This invention relates to a novel method and apparatus for improved photo intelligence techniques for the obtaining of a higher order of available data from photographic materials and the reduction of this data to a more useable form for a critical analysis of image intelligence derived from aerial photographic operations. More particularly it relates to a highly sophisticated system for providing an accurate photographic record of a character readily adapted to improved processing techniques for the determination and readout of the highest degree of intelligence resolution in a photographic film image. It further relates to an improved data readout system with emphasis being placed on multi-exposures of a given target area in order that specific data will be provided for each of a plurality of preselected bandwidths of light in the portion of the ambient light spectrum in which the system is intended to function.

More specifically the invention relates to a method and apparatus including an improved camera system for overcoming the major difficulties normally encountered in obtaining accurate data from a photographic medium and in which the normally encountered adverse problems relating to the fact that conventional lens systems focus different bandwidths of light at a different point with respect to the image plane of the photographic negative material are obviated. The invention further relates to photo intelligence techniques in which a plurality of cameras are utilized for providing photo coverage of the same area during an aerial photographic flight and in which each of the plurality of cameras utilizes a lens system of a character selected to focus at critical sharpness only a particular desired one of a plurality of bandwidths of interest of light and upon the individual film portion associated with that particular lens. This lens system is utilized with a bandpass filter of a character hereinafter described in greater detail and selected to effectively attenuate all bandwidths outside of the selected bandpass of the individual filter utilized for the selected bandpass of the individually color corrected lens utilized with each of the respective camera units of the system.

In order to exploit to the fullest the photo intelligence available from a film medium as obtained by aerial photography it is necessary to reduce the photographic record to a form which is readily assimulated by a human interpreter. Because of the complex nature of the photographic picture and the high storage density available in a film medium; in that the film medium is capable of recording far more shades of gray and capturing and retaining far greater resolution than it is possible to readout directly with the human eye. For example, high accuity films having resolution capabilities between 100 and 300 or more lines per millimeter are well within the present state of the art. On the other hand, a man with average visual capabilities is able to discriminate between about 5 to 7 optical lines per millimeter, at a viewing distance of ten inches, with the unaided eye. Similarly, while viewing a photographic print, the human eye is capable of discriminating between about 21 shades of gray, between black and white, in steps of about .045 density differences, yet in viewing a print on a transparent base (i.e., a positive transparency), the eye is capable of discriminating or detecting approximately 74 to 100 shades of gray by the use of variable intensity illumination behind the transparency. The instant system utilizes electronic means, photomultipliers are one practical device for the purpose, to sense density and to discriminate between gray shades a full order of magnitude closer in value than can be discriminated by the human eye. It is known that lens systems of the character generally utilized for aerial photographic reconnaissance and intelligence obtaining purposes are characterized by distortions and various other deleterious effects, one of which in particular is known in the optical arts, as coma. In conventional lens systems, including even those of the highest degree of optical correction for distortion and color, the various bandwidths or color portions of the light spectrum are brought to sharp focus at a different point on the film emulsion, hence a conventional lens system, if utilized for a wide light frequency spectrum, will produce a photographic negative which is of a high degree of sharpness only with respect to a very narrow bandwidth of the light impingent thereon or will be of a compromise design in which all colors recorded on the film will be out of focus to a greater or lesser degree, with none being critically sharp as to the image recorded. The other bandwidths of light will tend to produce a circle of confusion about the point of sharpest focus and this effect together with scattering effects of a character well known in the photographic art and which occur in the silver halide of the film emulsion, produce an unsharp image at any discrete point.

Conventional black and white photography makes no significant distinction in wave length or color throughout the photographic sensitivity range, 400 mu to 700 mu and can thus be described as simple amplitude modulation i.e., a straight ratio of incident light to a corresponding silver density. The prior art methods yield either sparce information for a specific case or unsatisfactory color rendition in the case of tri-stimulus subtractive systems. The airborne spectrophotometer may provide a somewhat feasible approach to this problem, but it has severe limitations because of discrete spot size and communication bandwidth problems existent with respect thereto, particularly in the presently available systems with magnetic tape as the storage medium at the present state of the art.

The novel method of the instant invention incorporates unique apparatus and procedures for the recording of a series of narrow bandwidths throughout the photographic range of film sensitivity to available light in order to provide a higher overall intelligence product during readout of the stored data recorded thereon. It provides a form of frequency or sensitivity modulation. The purpose of this frequency modulation is to product photography which has a greater photographic intelligence significance than any other photographic system heretofor or now in use. There are no known prior art methods which will provide all the functions accomplished by the instant system but there have been attempts in the past to achieve some of the special effects which are accomplished with the proposed system. These effects include camouflage detection, film-filter combinations to amplify the effects of spectral differences in the scene, additive color systems, subtractive color systems and the aforementioned airborne spectrophotometer.

The instant invention is directed to a system comprising a set of cameras having a capability of photographing the photographic bandwidth of interest, for example, by nine cameras with nine narrow light spectrum band areas reproduced thereby. Each camera is calibrated by use of a selected filter and a lens specifically corrected by the design and manufacture thereof for the bandwidth of intelligence desired to be recorded on the film by that particular lens or optical objective, in order that only a narrow spectral band desired for each of the areas, nine for example, will be in exact focus on the film plane. This arrangement advantageously provides a much smaller circle of confusion for each film-filter combination. The lenses are preferably of short focal length and have exceptionally wide apertures in order that, in each instance, the granularity of the film will be the limiting factor on resolution with respect thereto. The distribution of the film-filter bandwidth selected can be varied to suit the operational situation. For the purposes of this application a classical set utilizing the visual and near infra-red is exemplified. Accordingly the distribution selected will include violet, blue and blue-green in the blue subset; green, green-yellow and yellow in the green subset; orange, red and near infrared in the red subset.

The importance of resolution can not be overlooked in a system of this character because it reduces the bulk of equipment by a cube function and permits high sophistication in the collection of the desired data. By comparison, once a picture is taken in ordinary black and white or other systems which permit very little if any signal analysis, the only way the film can be read out is with the human analysis capability in terms of what the individual is able to observe visually. Analyzed carefully, the individual can detect only relative size, shape, gray shade or tone, texture or roughness, shadow (subset of shape but derived separately), and orientation. The system of the instant invention, by utilization of multiple recordings of different light set frequencies, permits a complete new area of film intelligence analysis. Each of the set of cameras, using normal focal planes produces a perspective photograph in which every point in each picture corresponds to the same coordinates on the other pictures of the set. The resolution and storage capacity of the film is utilized to create a record which may be reconstituted and studied under laboratory conditions.

Other novel techniques carried out during the processing phases for the individual subset negatives provides further enhancement of the quantity and value of the image intelligence recorded in the individual negatives.

These techniques will become more apparent as the description proceeds. Before proceeding with a detailed description of the apparatus utilized to practice the invention, it is considered desirable to present a description of the technical approach and the theory applicable thereto.

The medium of photography is currently able to record light from the near ultra violet (3200 A.) through the visible spectrum (4200 A.) into the near infra-red, approximately one micron of wave length.

Spectral zonal photography records this broad bandwidth of sensitivity through a number of independent narrow band filters, which may be absorptive or interference filters, to create a distinct integrated image more definitive of the object imaged in respect to reflectivity than that of the non selective broad band record of conventional photography.

This approach of spectral zonal photography provides three main results. The first result is increased resolution. By dividing and photographing the spectrum in reasonably discrete narrow bandwidths, the circle of confusion caused by the Fourier Transform of chromatic conditions can be significantly reduced. This factor is the principle consideration in producing ultra high resolution, i.e. resolution beyond the capability of any camera lens recording the full spectrum of light to produce images, photography.

If the spectral zonal camera systems are designed and computed so the resulting separate images are par focalized, the geometry of the images will be exactly conformal. The signals (images) can then be super-imposed (registered) to increase the signal to noise ratio by the square root of the number of integrations achieved. Providing the lenses are of wide aperture, thus:

$$\delta = \frac{\lambda}{d}$$

where $\delta$=resolution in radians, $\lambda$=wave length of radiation used, and $d$=diameter of optical system: so that the resolution is not lens limited, the random photographic granularity can be considered as noise limiting the signal (image) resolution. A signal to noise ratio gain will be achieved by the integration of the filtered records by photographic means. Utilizing the communication theory formula:

$$S/N = \sqrt{I^n}$$

This produces the following photographic formula:

$$I/Gr = \sqrt{R^n}$$

where $I$=the Image, $Gr$=the Granularity and $R^n$=the number of records integrated.

A sufficient degree of magnification in each image integration step is required to render the signal (image) enlarged to a degree to permit the resulting integrated image to be well above the limiting noise of the granularity of the receiving emulsion (i.e., a four time magnification is considered to be appropriate for 200 lines per millimeter resolving power in the first and second steps). This procedure, when used with high acuity distortion free optics, makes precision registration well within the capability of precision mechanisms available within the highest commercial quality measuring devices.

The first integration of the records using the aforementioned photographic formula produces a gain of approximately 1.7. By further super-imposition of the transparencies, a full color rendition may be produced which is about three times better than any one picture of the same area.

The second result of spectral zonal photographic method of this invention is modulated color photography. In the classic example of the camera system as hereinbefore set forth uses the visible bandwidth separated into nine bands. This requires two sets of integration. The first set integrates the nine bands, in groups of threes, into the primary additive color positive transparencies. These are thereafter projected to produce a fully balanced color presentation for photo interpretation.

The second integration set is utilized to produce a full spectrum negative in the third generation. The resolution of this master negative is about three times the original resolution value of any one bandwidth. This negative is thereafter used for maximum discrimination and mensuration purposes. The advantage of this type of color is that it can be balanced to a standard in terms of ambient light. Apparatus of a character suitable for recordation of the values of the ambient light is hereinafter set forth in greater detail.

The third and final result is that the instant concept produces a new spectrophotometric photography. If the images are of exactly the same geometry, then each image coordinate density is proportionate to the amount of light per band reflected from the object imaged. When this is true, the analog density reading for each frequency band for a given point may be converted into digital value. These values when integrated mathematically will be the same as the values output by a spectrophotometer for the same object imaged. While the instant camera system as normally utilized for spectral zonal photography is passive, it is to be understood that in instances wherein light sources other than the illumination of the sun is used, the system may well be used as an active sensor. Lasers or masers are being rapidly advanced in the art, hence, are readily adaptable as light sources for photography in that they may be utilized as calibrated energy sources for use with photographic films particularly tailored for use therewith as the recording medium. Systems of this character will preferably use a scanning mode for illumination of the target field to be imaged.

This novel form of photography yields manifold results from data collection as compared to conventional photography. For the first time, non-human digital analysis factors are produced. Previously, data collection results were defined in human values of size, shape, tone, texture, shadow, pattern, location and orientation. In rare cases, tri-stimulus and subtractive color have been of limited use in photo interpretation. Spectral zonal photography provides all of these as well as the new machine language characteristics for photographic intelligence readout data correlation and computer storage.

One of the most important concepts of the instant invention is the digital analysis readout of the original negatives produced by spectral zonal photography. The readout so obtained is essentially a signature for the specific target expressed in terms of amplitude modulation of its spectral response to radiation. This principle is intended to be used to obtain characteristic signatures of specific targets by readout of multisensor records as well as spectral zonal photography. In the practice of the instant invention, extended signatures can be obtained from targets not only in the ultraviolet and visual frequencies but also in the infrared, microwave, radiometry (passive radar), UHF, LF, and VLF frequency ranges as well. Furthermore, this multi-frequency amplitude modulation concept can be used to analyze and correlate non-electromagnetic, gravity measurements, acoustic, and magnetic sensor data in a single system concept. The inventive concepts are disclosed as directed to the development of the techniques utilized for visual frequencies, initially to allow a better overall study and evaluation of the machine language aspects thereof by those practicing the invention and in an area where visual analysis is well developed. It thus gives the best definition of the man-machine interface aspects of advanced sensor systems, the data reduction requirements, and system designs.

Utilizing the above theory, the instant inventive concept is directed to both unique apparatus and a novel method for collection and data reduction. It comprises the aforementioned spectral zonal camera, an ambient light record, and inertial or navigational location record and the vehicle such as an aircraft for carrying exposure obtaining portions of the system.

The spectral zonal camera hereinafter described in greater detail is made up of specifically designed modules which are mounted in groups. These combinations are tailored to fit the environment of the carrying vehicle and to cover specific bands for a target being searched out. The camera system is essentially custom designed to fit the problem parameters. For example, a space system for photographing the earth would probably not try for signature data below blue/green because of the exceedingly low signal to noise ratio in the shorter wave lengths (due to Rayleigh scattering in the Chromosphere). There is no atmosphere as such on the moon and there should be no scattering in the shorter wave lengths. Therefore, a spectral zonal camera for photographing the moon probably would be comprised of the full bandwidth ranging from the ultra violet as far as possible into the infrared. It is envisioned that as many as fifteen modules would be utilized in this type of camera for photographic exploration of the moon.

The satellite or other vehicle carrying the system would in such an instance be equipped with apparatus the details of which form no part of this invention, for obtaining an inertial or navigational location record for orienting the photography with reference to cartographic coordinates. Reconnaissance would be carried out to cover the area desired with standard overlap procedures for subsequent visual stereo examination and standard photogrammetric data reduction. The camera, films, and all recorded data would be delivered to the data reduction center for processing and analysis.

In the data reduction phases of the invention all sensitized film must be treated with utmost care. Standardized sensitometric processing is used with attention being directed to the highest quality control possible under clean room conditions. Master integrated positive enlargements are produced by special integrating devices hereinafter described in greater detail for master blue positive, green positive and red positive records. These high resolution records are thereafter utilized for at least two purposes, i.e., for additive color projection or for color printing to be interpreted by visual analysis, and for integrating and enlarging into broad bandwidth negatives for standard photographic interpretation and photogrammetry.

The master original negatives may be scanned electronically in accordance with techniques described with greater particularity in U.S. Patent application of Robert S. Neasham Ser. No. 497,563, filed Oct. 18, 1965, to search for spectrophotometric signatures by an automated processing technique.

The instant spectral zonal photographic method and system is well adapted to provide an overall increase in the magnitude of data obtainable if used in an orbiting satellite for reconnaissance purposes. The versatility, in that it provides black and white high acuity photography, modulated color photography, and a new spectrophotometric photography renders it an ideal system for such uses.

In order to facilitate the correction of any differences occuring in the color values of the individual subset negatives and to provide proper correlation of these color values with the ambient light spectrum values existent at the time of the exposure of the subset negatives by the aerial camera, it has been found desirable to obtain a contemperaneous film record of the spectral range values of the available ambient light. It is preferable to obtain this film record at the ground plane in the nature of an incident light type of record, thereby providing a means of obtaining an accurate correction of the light values actually illuminating the subject. A light record taken at the ground plane will not be adversely affected by light scattering effects of the atmosphere as would be the case if the film record were made from the aircraft from which the exposure of the aerial photographs were obtained. This will provide a means, utilizable during film processing, of correcting the color values of the subset negatives to correspond with the actual light values existent at the ground plane, rather than a comparison of the light values of the exposures from the aerial camera, as compared with light values existent at the aircraft. In certain instances where the target area to be photographed is not accessible for placement of a monitoring light value film recorder, the same may be incorporated in the aircraft to provide a correlation of the last mentioned type in lieu of the preferable record of the aforementioned type. The light record if taken at the camera position by an aircraft in flight may advantageously be obtained through an astrodome type device or the like on an aircraft which will carry both the recording camera for the ambient light value records and the nine unit camera for exposure of the photo-intelligence record.

The exposures for the ambient light records are also of an incident-light reading nature when taken from the aircraft, as distinguished from reflected-light types of readings, but will differ somewhat in color value from a record of a type taken at a ground plane, although the light values to which an aircraft is subjected by virtue of its higher altitude will be influenced to a lesser degree by the scattering effects of the atmosphere between the aircraft and the ground plane to which the nine unit camera exposures are subjected. Hence in either system a color value correlation will be provided which will be of a greater or higher degree of accuracy than the color rendition values obtained by the nine unit camera when photographing a ground plane for photography from an aircraft in flight.

A camera suitable for the aforementioned purposes includes a dome shaped mounting for a plurality of small long focal length lenses which are disposed to have substantially a common point of focus at a common film plane. The lenses are advantageously disposed in a mosaic like pattern with a condensing lens or a plurality of condensing lenses disposed to intercept the path of groups of the individual lenses and bring the individual lens systems into focus on a continuously variable circular interference filter disposed intermediate the optical beam path, between the lens and the exposure aperture, at the shutter plane of the camera. The camera is of a conventional spool film nature with a continuously driven takeup reel which is driven in synchronization with a drive mechanism preferably of a DC motor type for synchronized rotation with the filter disk. The filter disc is similar in nature to a stepped wedge type densitometric gray scale, and of incrementally changing character about the periphery thereof. By utilization of the portions of the light spectrum from all of the small long focal length narrow acceptance angle lenses in the astrodome mount, a color value type film record will be exposed during the period of exposure of the topography as obtained by the nine unit camera. The specific structure of the ambient light recording device is not herewith claimed as a portion of the instant invention. The details do not form a portion of the instant invention as other apparatus of a differing nature could be utilized for this purpose. The discription is included for purposes of greater clarity of understanding of the instant inventive concepts. In the event the ambient light record recording camera is disposed on the ground plane, suitable means of a character known in the art, such as radio control communication equipment may be utilized to energize the drive motors in the ambient light record recording camera during periods of exposure for aerial flight records. If desired however, the ambient light recording device may be run in a continuous manner to provide a sampling over various periods of the day to provide additional information which is sometimes desired for further correlation of the intelligence obtained from the picture, i.e., for detecting camouflage and the like.

It is a feature of the instant invention to provide an improved system for obtaining and processing image intelligence as characterized by a photosensitive photographic medium for photo-intelligence interpretation purposes in which the intelligence information available as readout data is of a greater order of magnitude than that available from photo-interpretation systems or procedures or combinations of systems heretofor or now in a common use.

One object of the instant invention resides in the provision of a novel photographic camera apparatus in which each of a plurality of objective lenses utilized therein is characterized by maximum sharpness and optical correction for a discrete portion or bandwidth of the ambient spectrum of light energy to be photographed by the camera apparatus and further in which an effectively individual filter of a plurality of mutually different individual filters is utilized for the discrete bandpass of each lens.

In correlation with the foregoing object it is a further object to utilize spectral zonal techniques in the exposure of a plurality of separate photo sensitive mediums in a manner to obtain maximum resolution of the individual film images whereby the plurality of individual image containing photographically exposed negative film mediums may advantageously be integrated during printing of the photo-positives derived therefrom to materially enhance the image-to-granularity ratio in a manner similar to the enhancement of a signal-to-noise ratio in electrical communications applications.

Another object of the instant invention resides in the provision of a highly refined system for providing a higher degree of readout in the form of exact film data, as obtained from a multi-lens camera, which film data includes the precise focal image in sharpest focus and of the highest resolution for each individual one of a subset of a plurality of selected bandwidth sets of ambient light, than has heretofor been obtainable by prior art techniques.

Another object resides in an improved method of exposing and processing photographic materials in a manner to provide an optimum intelligence readout capability of aerial photographs for photo-interpretation, reconnaissance, camouflage and similar data collection and storage purposes.

Another object resides in an improved spectral zonal photographic technique in which a photographic record directed to the obtaining of the data indicative of the ambient light characteristics existent at the time of exposure of spectral zonal photo negatives is utilized to enhance the overall photo-intelligence readout ultimately obtained by the practice of the invention concepts of the instant invention.

Other objects, advantages and novel features of the present invention will become apparent from the following details description of the invention when considered in conjunction with the accompanying drawings wherein:

Figure 1:
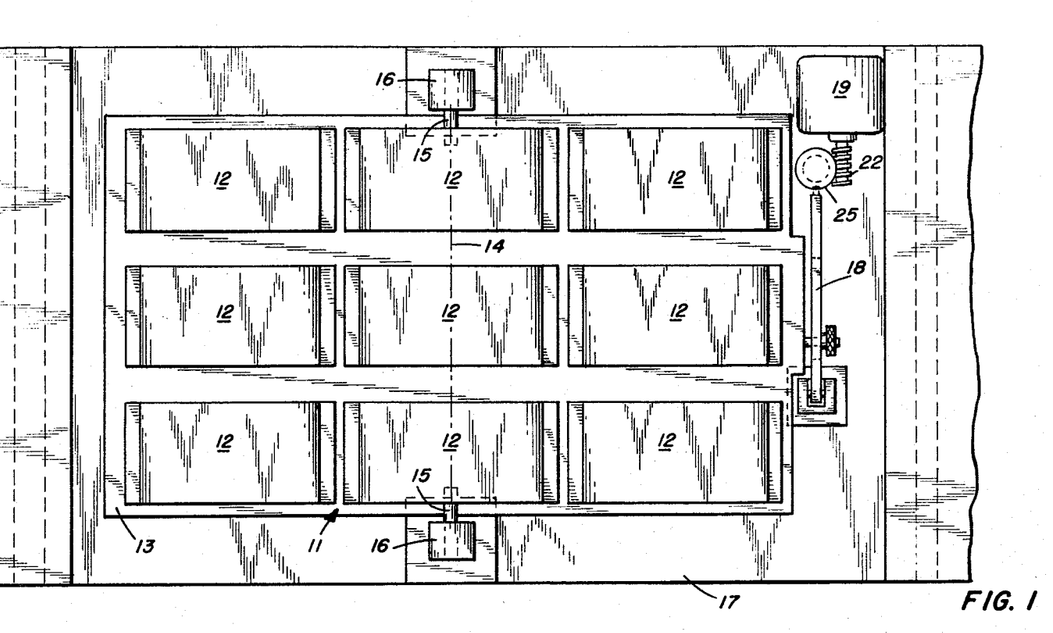
FIG. 1 is a diagrammatic illustration in plane view of a camera apparatus embodiment in accordance with the instant invention, by virtue of which the simultaneous photographic exposures for a plurality of subsets of discrete bandwidths or color portions of the ambient light spectrum for carrying out the negative exposing portion of the inventive concepts of the instant invention may be obtained.
Figure 2:
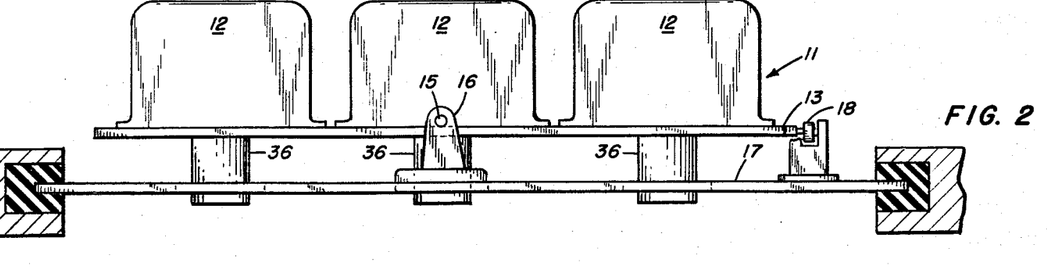
FIG. 2 is a side elevation view of the camera apparatus of FIG. 1 further showing details of the mounting structure for the camera carrying portion of the mount for the apparatus of FIG. 1.

Referring now more particularly to the embodiment of the instant invention indicated in FIG. 1, a camera apparatus 11 is shown as comprising a plurality of nine individual camera units 12 for purposes of illustrating the inventive concepts of the instant invention.

Figure 3:
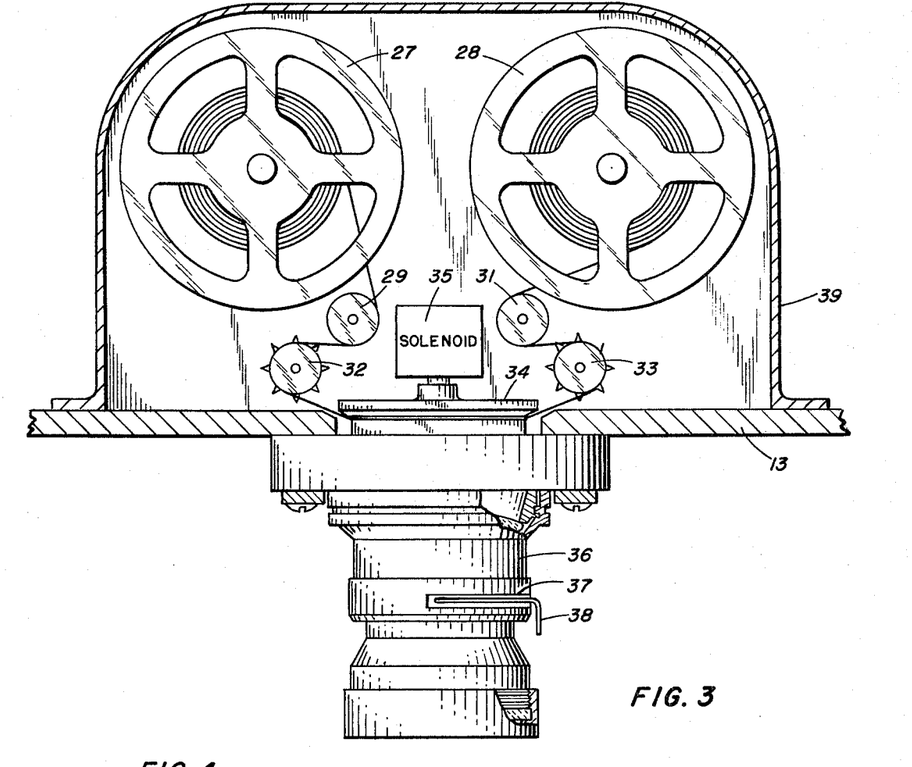
FIG. 3 is a side elevation view with portions in section and broken away of an individual camera unit of the camera apparatus of FIG. 1.

The individual camera units 12 shown in greater detail in FIG. 3 are mounted on a common mounting plate 13 which is pivotably mounted along an axis 14 on suitable shaft elements 15 supported by bearing brackets 16. The brackets 16 are in turn carried by the main camera frame 17 which permits a controlled degree of oscillation of the camera assembly unit 11 about the pivotal axis 14. A suitable drive mechanism generally indicated at 18 for accomplishing the oscillatory movement of the camera mounting plate 13 is driven by a motor 19 best illustrated in FIGS. 1, 4 and 5. The output shaft 21 of motor 19 carries a worm 22, for a conventional worm shell 23, by means of which the cam shaft 24 drives cam 25.

Referring now to FIG. 3 there is shown a more detailed diagrammatic view of a camera 12 of the camera unit 13 of a character suitable for obtaining on the individual film exposures of the nine unit camera assembly of FIG. 1. A takeup reel shown at 26 and a supply reel 27 for the film 28 are driven by a conventional drive motor (not shown) of a character well known in the aerial camera art. A pair of tension idlers are disposed respectively at 29 and 31 in the film path immediately preceding and following respectively of the feed sprocket 32 and the takeup sprocket 33. The drive for these sprockets (not shown) is of an intermittent nature to expose frames in a conventional incremental manner well known in the art. The backing plate 34 for the film plane is preferably moved out of the path of film travel during film advance movement. The backing plate 34 is controlled by the solenoid disposed at 35. The lens mount is of a conventional nature and is shown generally at 36. Disposed for introduction into the light path between the front and rear elements of the lens mount 36 is a filter slot 37 for reception of either the interference type filter generally indicated at 38 or a conventional light pass subtractive type filter of a well known character. The manner of use of the latter type filter and the function thereof is hereinafter described in greater detail. A housing enclosure 39 is attached to the mounting plate 13 in any suitable manner to provide a light tight enclosure for the film spooling and advancing mechanisms.

Figure 4:
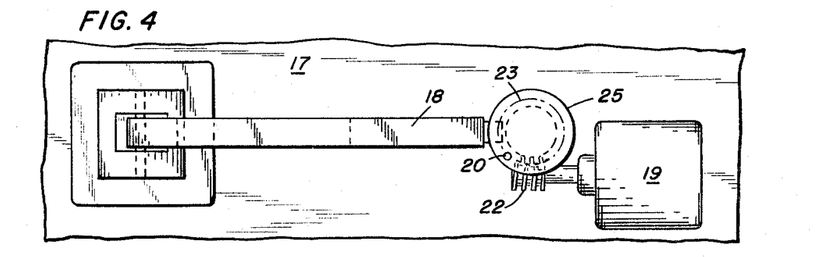
FIG. 4 is a plane view of the nodding mechanism incorporated in the camera apparatus mounting structure for obviating distortions normally occasioned by relative movement between a camera shutter of the focal plane variety and the object being photographed when either the camera or the object to be photographed by the camera is in motion as in the situation when the camera is mounted in an aircraft.
Figure 5:
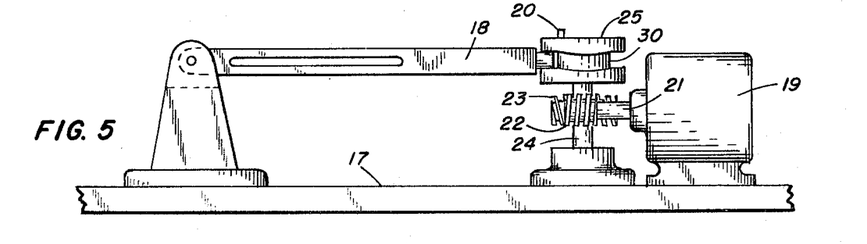
FIG. 5 is a fragmentary view in elevation of the right angle drive and nodding cam drive linkage device incorporated for the mount of the camera assembly of FIG. 1.
Figure 6A:
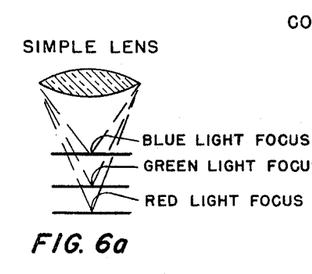
FIG. 6(a) is a diagrammatic illustration indicative of the plural planes of focus of light of differing color bandwidths as focused by a simple lens.
Figure 6B:
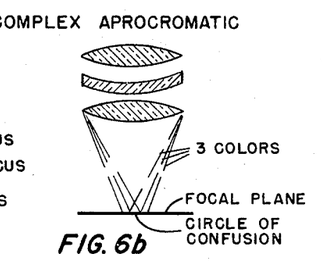
FIG. 6(b) is a diagrammatic illustration similar to FIG. 6(a) which is indicative of the manner in which the three primary colors of light namely blue, green and red produce a circle of confusion when a lens of the complex apochromat type of correction brings these three colors into focus in a single image plane.
Figure 6C:
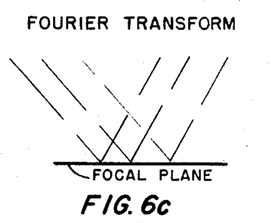
FIG. 6(c) is a diagrammatic illustration in elevation of the Fourier Transform characteristic of a lens of the character of FIG. 6(b)
Figure 6D:
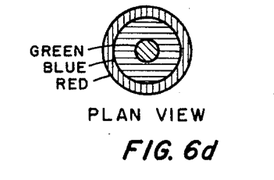
FIG. 6(d) is a plane view for the purpose of indicating the circle of confusion at the image plane resulting from the exposure of a photographic negative with a lens of the character of FIG. 6(b)
Figure 6E:
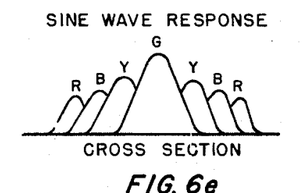
FIG. 6(e) is a diagrammatic illustration indicating the sine wave response to the primary colors produced by a lens of the character of FIG. 6(b)
Figure 7A:
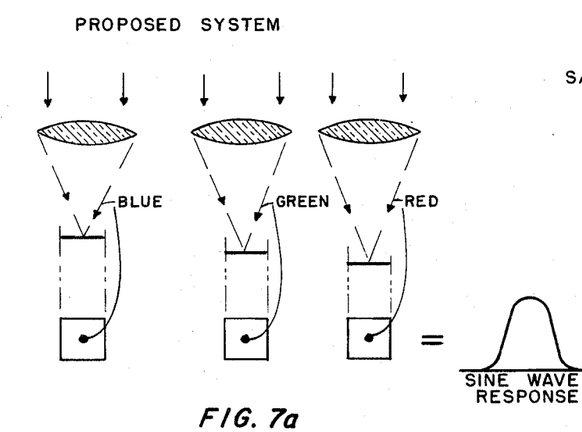
FIG. 7(a) is a diagrammatic illustration indicating the manner of obtaining improved sine wave response to the primary colors after the passage of the parallel light through individual filters therefor with a photographic procedure in accordance with the inventive concepts of the instant invention.
Figure 7B:
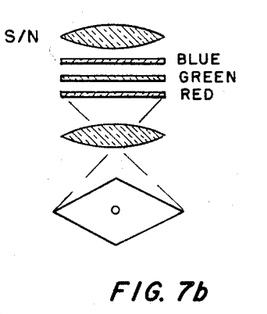
FIG. 7(b) is a diagram indicating the manner of integrating the developed film emulsion negative images of FIG. 7(a) during printing of the first integration positive from three color negatives in order to improve the signal to nose ratio or image to granularity relationship for the composite print obtained therefrom.

In view of the diagrammatic nature of FIGS. 4 and 5, the housing structure normally utilized to enclose the right angle worm and worm wheel type gearing is not illustrated, although it is to be understood that a suitable gear box housing would be utilized in the actual physical embodiment of the apparatus.

Figures 15, 16, 17:
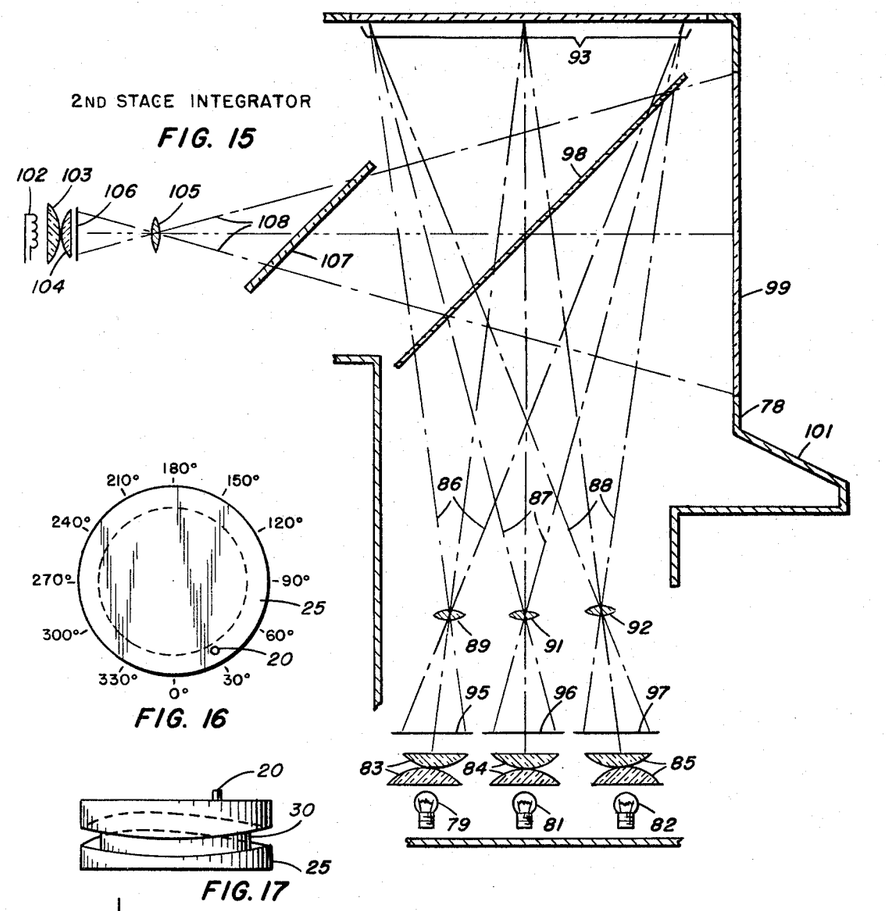
FIG. 15 is a diagrammatic illustration of the optical system arrangement and relationships as utilized for the second stage integration process with respect to the intermediate positives of FIG. 9 for obtention of the negative from which the positive transparency utilized with the spectral zonal color viewer of FIG. 14 is ultimately obtained.
FIG. 16 is a diagrammatic illustration in plane view of the nodding cam of FIGS. 4 and 5.
FIG. 17 is an elevation view of the cam of FIG. 16.
Figure 18:
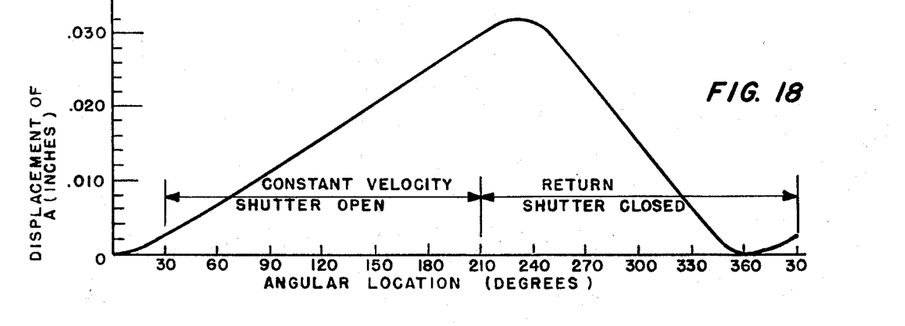
FIG. 18 is a diagram of the development of the cam of FIGS. 16 and 17, indicating the shutter relationships with respect to the nodding of the camera as produced by the nodding cam drive of FIGS. 4 and 5.

Referring now to FIGS. 16, 17 there is a more detailed showing of the cam 25 and FIG. 18 wherein there is a showing of the timing relationship existent between the nodding cam 25 and the tilting bar 39, which is connected to the camera mounting plate 13 as shown in FIGS. 1, 2, 4 and 5, and the shutter actuating pin of FIGS. 16 and 17, which triggers the shutters of the nine cameras in synchronism at a predetermined position during rotation of the cam 25.

Figures 13, 14:
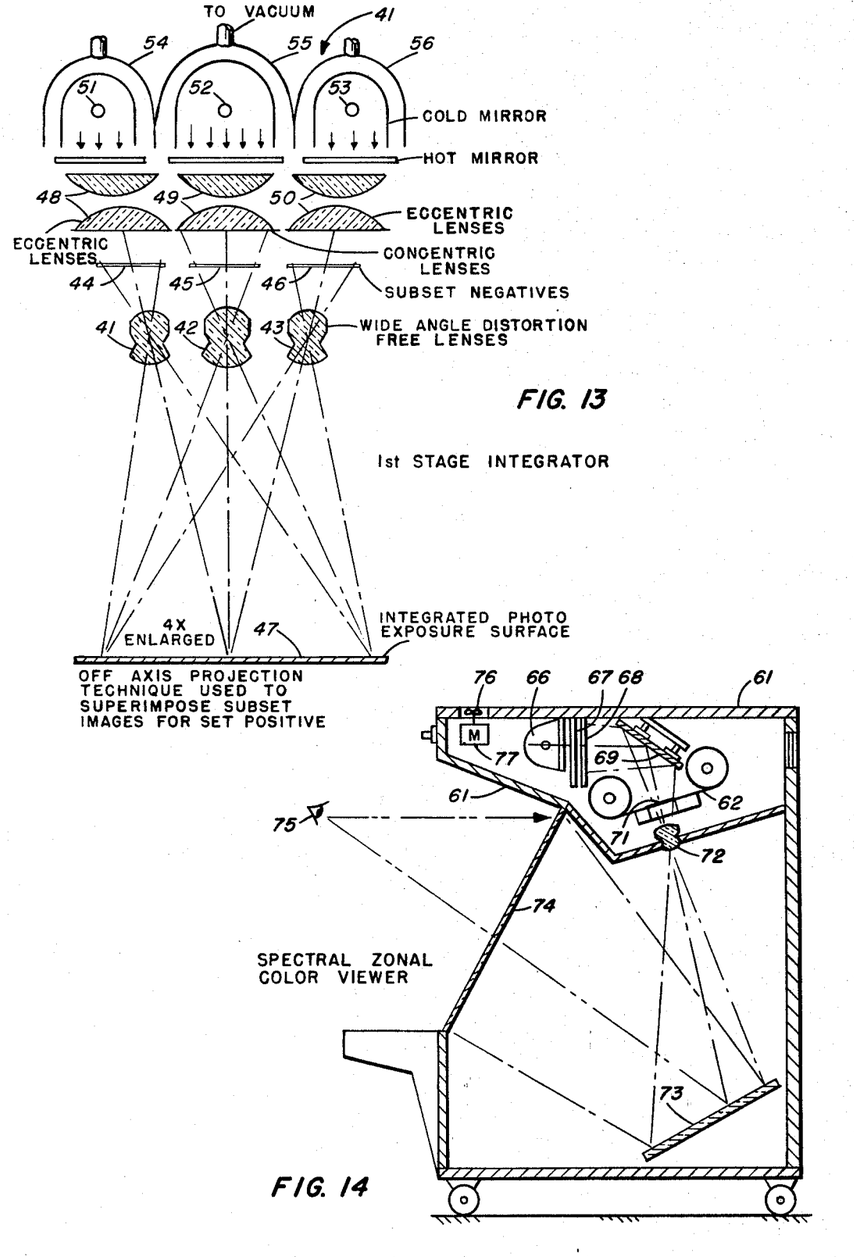
FIG. 13 is a diagrammatic illustration in elevation of a first stage integration printing apparatus for printing an intermediate positive from the negatives obtained from the individual color subsets of FIG. 9.
FIG. 14 is a diagrammatic illustration in elevation of an optical rear projection type viewer for the spectral zonal color readout of data from the positive transparency obtained by printing the negative resulting from the integration of the three intermediate positives of FIG. 9.

Referring now to FIG. 13 there is shown in diagrammatic form a projection apparatus 41 for use in accomplishing the first stage integration of the three subset negatives for printing a given color set negative. The assembly includes three wide angle distortion free lenses 41, 42 and 43. The three lenses are disposed in a common mount (not shown) for projecting light, in an arrangement generally similar to a conventional enlarger, through the three subset negatives 44, 45 and 46 onto an integrated photo exposure surface in the nature of a film at the focal plane 47 of the three lens system. The three lenses are of equal focal length and each passes a separate beam from separate pairs of condenser lenses 48, 49 and 50. The condenser lenses are individual to the corresponding lens of the three lens assembly which assemblies are disposed between the lamp house and the projection lenses. Each of the light source assemblies preferably includes a light source 51, 52 and 53 respectively for cold mirrors 54, 55 and 56 which are maintained in an evacuated, double or vacuum wall type structure. Hot mirrors 57, 58 and 59 respectively are interposed between the light sources and the associated upper one of the pairs of condensing lens elements. The center pair 49 of the three pairs of condensing lenses is a concentrically disposed condensing lens system, while the two outermost pairs of condensing lenses 48 and 50 are disposed slightly eccentric to the axis of projection of the projection lenses therefor when considered with respect to the axis of the center lens 42. In this manner the projected images from the three individual ones of the subset negatives are brought into focus in a registered relationship on the film plane 47 in a manner which is deemed apparent to those skilled in the art.

Figure 21:
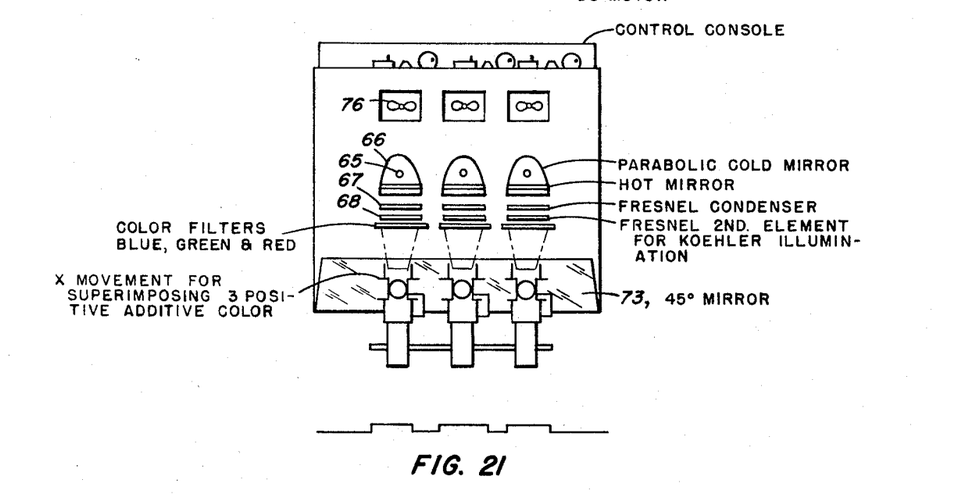
FIG. 21 is a plane view of the spectral zonal color viewer of FIG. 14.

Referring now to FIGS. 14 and 21, a spectral zonal color viewer for viewing the ultimate or final positive transparencies obtained from the product of the three or more second stage integrations, hereinafter described in greater detail, are projected from a plurality of at least three reflex type projectors 61. The description is directed and limited to a typical one thereof in which the film strip 62 is carried by suitable spools or reels 63 and 64. These spools may be advanced in synchronism for all three projectors 61 in any suitable manner, as for example by a manual hand crank (not shown) disposed to be accessible from the outer portion of the housing, or preferably by a motor driven advance means of any suitable conventional character known in the art. The light source 65, which is surrounded by a parabolic reflector 66, projects a light beam through a pair of Fresnel condensers 67 and 68 onto a first surfaced mirror 69. The light beam reflected therefrom is passed through the film 62 carrying the image intelligence which is focused by the projection lens 72 onto a second front surface reflecting mirror 73. The image is then reflected from the mirror 73 onto a ground glass surface 74 by rear surface projection techniques. This provides a capability for viewing of the image intelligence by an observer disposed at the position indicated by the eye symbol 75. A fan 76 and fan motor 77 may be provided if desired. Advantageously the spectral zonal color viewer of FIGS. 14 and 21 may be incorporated in a cell assembly of the character described in the copending application of Robert S. Neasham, Ser. No. 475,294, filed July 27, 1965.

The structure of the second stage integrator 78 as shown diagrammatically in FIG. 15, incorporates three light sources 79, 81 and 82 and three condensing lens pairs 83, 84 and 85 generally of the same character as shown in FIG. 13 for the first stage integrator. Similarly the outermost two 83 and 85 of the pairs of condenser lenses are disposed eccentrically with respect to the optical axis of the center condenser 84 and its light beam 87 to bring the images from the films 95 and 97 as projected in the beam paths from these two outermost beams 86 and 88 as focused by lens 89 and 92 into registration at a common coincident plane at 93 with the image from film 96 as projected in beam 87 by projection lens 91. Disposed within the housing for the second stage integrator 78 is a half silvered mirror 98 which facilitates viewing of the combined images in the three beam paths upon a rear projection screen 99. The screen is disposed immediately above the operator's control panel at 101.

The control panel includes among other controls (not shown) means of either a mechanical nature or of an electrical servo nature for providing micrometer type adjustments of the x, y and z axis movement of the plurality of film plane stages to provide for precise adjustment thereof to insure precision registration of the integrated exposure images at the exposure plane 93.

The actual exposure of the integrated color negative from the color additive positives 95, 96 and 97 occurs at the plane 93.

The details of the mechanisms utilized to provide the desired individual x, y and z axis movements independently for each of the films 95, 96 and 97 as well as plane 93 form no part of the instant invention inasmuch as structure of this nature is well known in the art.

Additionally the second stage integrator rear projection viewer 78 may, if desired, be modified in a manner described in the copending application of Robert S. Neasham, Ser. No. 450,554 filed Apr. 23, 1965 to provide further image enhancement by interferometric techniques.

The second stage integrator-viewer 78 further includes an additional light source 102 with a suitable reflector therefor (not shown) and an associated pair of condensing lens elements 103 and 104, and a projection lens 105 for projection of a master photo disposed at 106 onto the viewer ground glass or rear projection screen 99. A transparent correction plate 107 of a character well known in the art, is disposed in the beam path 108 to provide compensation for the light bending effects produced by passage of the light beam thereof through the half silvered mirror 98. The control switches (not shown) for all of the light sources 79, 81, 82 and 102 are preferably located on the control panel 107.

The projection portion of this apparatus for the beam path 108, may be utilized for several additional purposes as desired. It may be used to project a master black and white image for combination with the color image intelligence to further enhance the readout values provided. This may be considered as somewhat comparable to the use of a "mask" for black and white values as used with a plurality of tri-color dye transfer type negatives in a dye transfer printing process for color positives. Additionally this portion of the apparatus may be used to alter the amplitude of illumination to compensate for light losses resulting from the attenuation effects of projection of the color images through the half slivered mirror. This provides a light fogging effect to raise the image exposure level above the toe portion of the exposure density curve and into the linear portion thereof. This particular additional illumination may be passed through suitable color filters to provide desired corrections during printing of the film material of plane 93. In general light color correction for an individual one of the beam paths 86, 87 and 88 would be interposed in the particular beam path requiring correction, or in all beam paths if all require the same correction.

Figure 19:
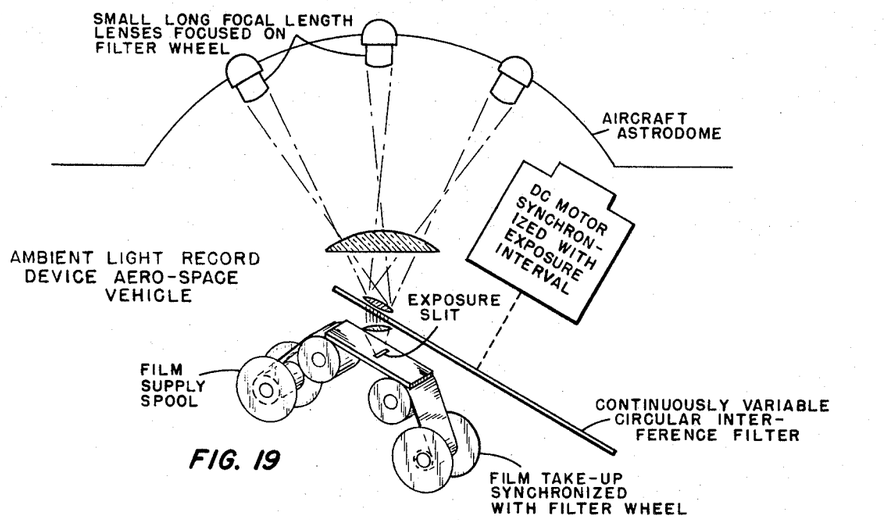
FIG. 19 is a diagrammatic illustration of an ambient light recording device utilized with the spectral zonal system.

The illustration of FIG. 19 is directed to one of two types of ambient light recording devices for obtention of a spectral signature at least during the period of time during which exposures are being obtained by the nine lens camera. A detailed description of this structure is not included in view of the foregoing commentary on the purpose and nature of the various elements thereof. Moreover, the functioning thereof is considered to be adequate to permit practice of the invention by those skilled in the art to which the instant invention is directed. The second type of ambient light recording device differs from the foregoing type, primarily in the addition thereto of a chronometer, the face of which is disposed to provide a record on the film as to the precise time each individual exposure is made. The former and illustrated version of this recorder is mounted in the aircraft carrying the nine camera assembly. The latter type is located at the ground target location.

Figure 8A:
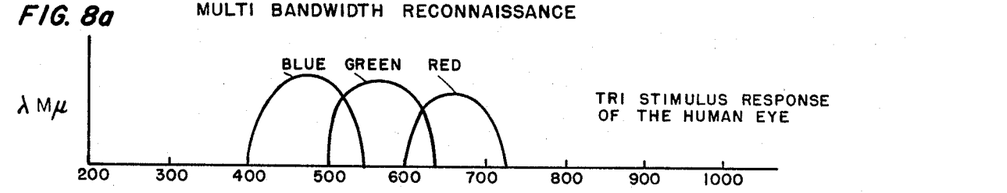
FIG. 8(a) is a diagrammatic illustration indicating by typical curves a generalization of the tri-stimulus response of typical or average human eyes to the three primary colors blue, green and red.
Figure 8B:
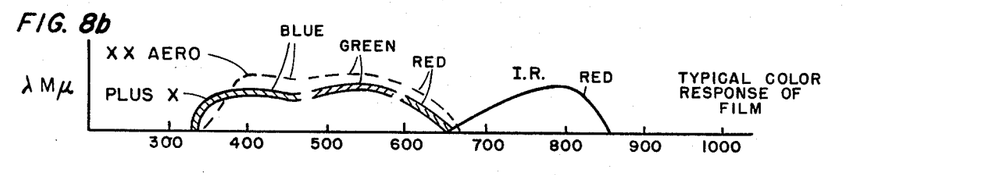
FIG. 8(b) is a diagrammatic illustration indicating by way of example, the typical color response characteristics with respect to the light spectrum of interest of two commercially available photographic negative materials of a conventional character, one of which is a medium speed film as rated by ASA index standards and the other of which is a fast speed film.
Figure 8C:
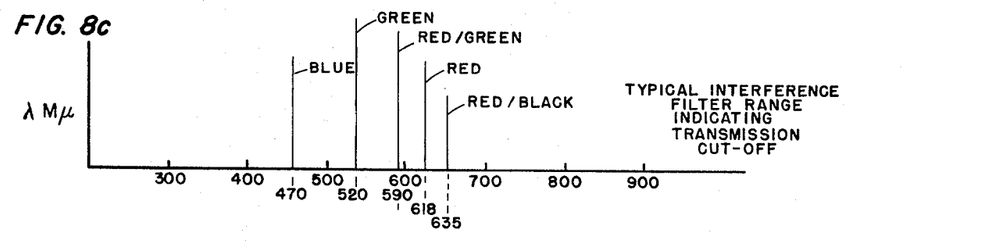
FIG. 8(c) is a diagrammatic illustration of the transmission cut-off characteristics of a typical interference type filter, with frequency range characteristics suitable for utilization with the inventive concepts of the instant invention. The curve is also indicative of a desired range for use in the event subtractive type filters generally of the Wrattan type are utilized in lieu of the transmission cut-off type, and in either instance a plurality of color bandwidths of the ambient light spectrum.
Figure 8D:
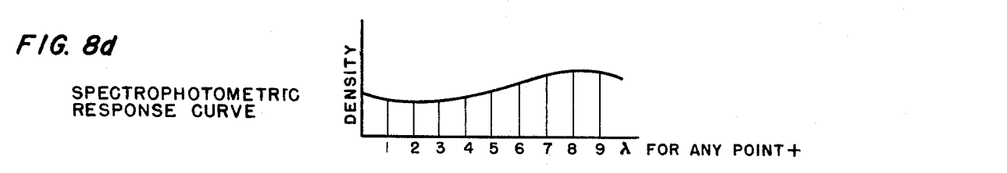
FIG. 8(d) is a spectrophotometric response curve indicating the variation in the density versus λ.
Figure 9:
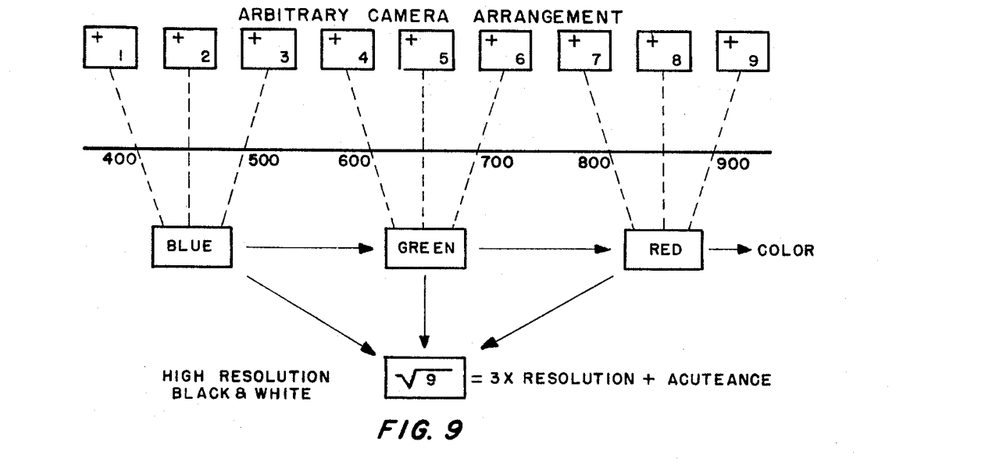
FIG. 9 is a diagrammatic illustration of the manner in which the films as exposed by the nine camera units of FIGS. 1 to 4 of the instant system are utilized with filters of discrete bandwidth characteristics for obtaining negatives for the subsets of the blue set, subsets for the green sets and the subsets for the red color set, and further indicates the manner in which the films may be combined to provide an integration in which the resolution and acuteness resulting therefrom are increased by a factor of three.
Figure 10:
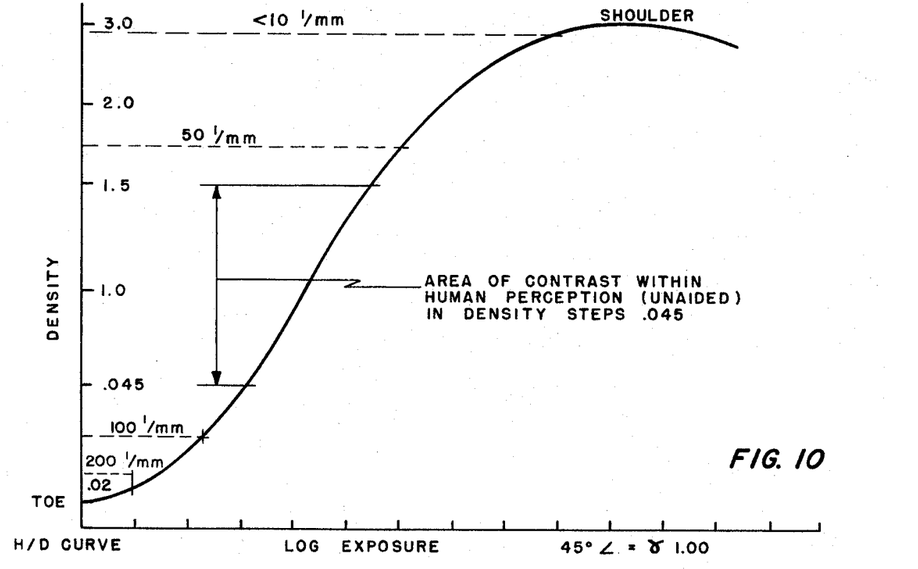
FIG. 10 is a diagrammatic illustration showing a graphical plotting of density with respect to the log of exposure to provide an H & D curve upon which curve indications of the area of contrast, within the human perspection (unaided) exists in density steps of .045.
Figures 11, 12:
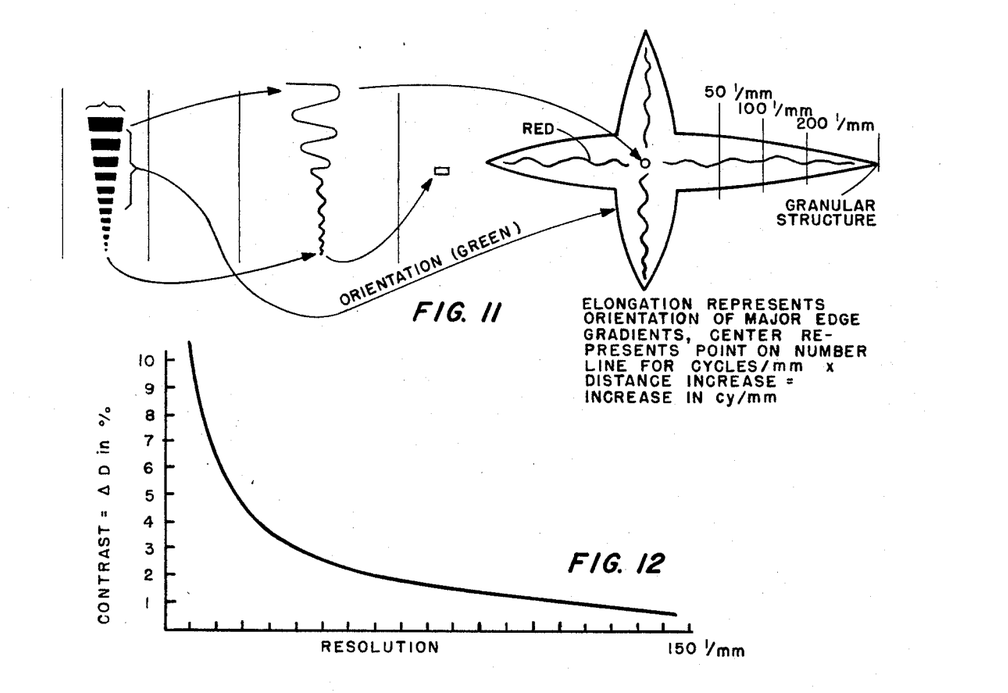
FIG. 11 is a diagrammatic illustration of a resolution target densitometer trace in which the elongation represents orientation of major edge gradients; the center portion represents the point on the numbered line for cycles per millimeter times the distance increase, and in which the increase is indicated as the increase in cycles of a sine wave per millimeter.
FIG. 12 is a diagrammatic illustration showing a curve plotting of contrast increments of density in percent versus resolution.
Figure 20:
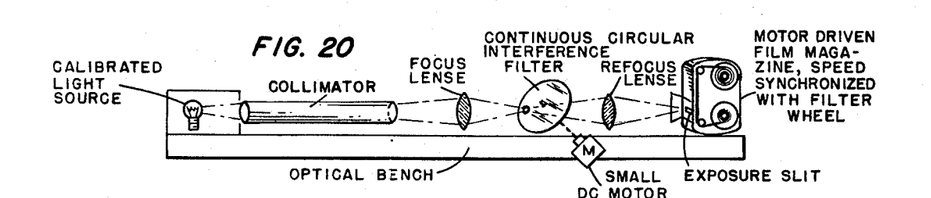
FIG. 20 is a diagrammatic illustration of a device for measuring the quantum response of photographic film throughout the spectrum of photographic sensitivity.

FIG. 20 is directed to a laboratory type device generally similar in character as to a certain portion of the structure thereof to that of FIG. 19, but differing therefrom in that a calibrated and collimated light source is disposed on an optical bench together with a single focusing lens which is utilized to provide the illumination for the photographic exposures indicative of changes in the spectral response of a given film intended for use in the nine unit camera assembly and under test for the color ranges permitted to be passed through the continuously variable interference filter during rotation thereof for interception of the light beam passing therethrough to the film. The readout of spectral response of the film as indicated diagrammatically in FIG. 8(d) as to silver hailed exposure to free silver and correlative to color changes may be obtained by a sequential scanning in an incremental manner of the developed film negative preferably in a Boutrophedon pattern with a spectro-densitometer, with the amplitude data values obtained thereby being so assigned as to give a digital value to various degrees of change in film response. The readout may be obtained by the utilization of a photo cell or photomultipler cell for transducing light value changes occurring during scanning of the film negative by a light source projected by a microscope type lens system, through the film and onto a light-into-electrical impulse type transducer of the aforementioned character, with changes in amplitude of the electrical signals being assigned digital values for ultimate utilization in a digital computer system, of a character known in the art. Cathode ray tube devices having linearity, drift and spot size capabilities compatible to the system requirements, or fiber optic devices, may also be utilized for precision microdensitometry purposes.

Figure 22:
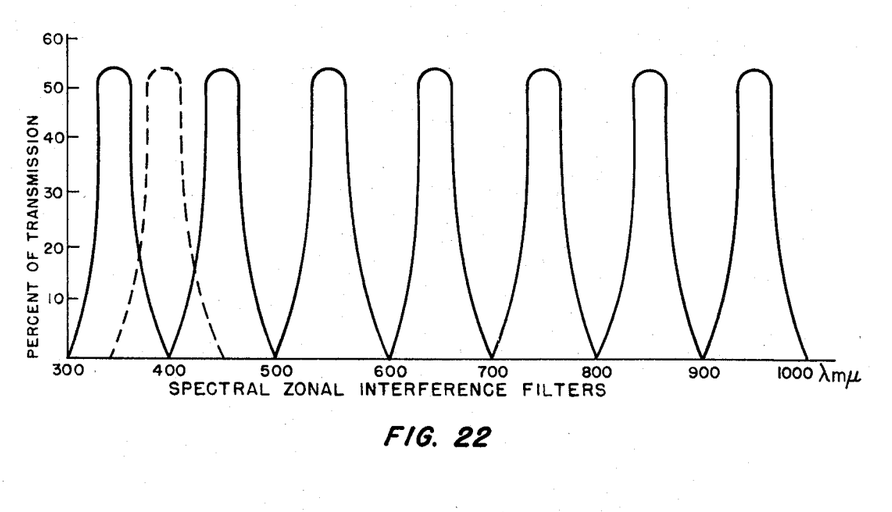
FIG. 22 is a diagrammatic illustration in graphical form which indicates the response characteristics of interference type filters for use with the instant spectral zonal system.

The subject matter of FIGS. 6 to 12 inclusive and FIG. 22 is considered to be self explanatory or apparent to those skilled in the art to which this invention pertains when taken in view of the foregoing description of the theory of the inventive concept. Accordingly since these figures are included for purposes of providing a better overall understanding of the special techniques applicable to the invention as applied to photographic materials rather than to define structural relationships for practice of the invention by the techniques disclosed herein, further amplification is considered unnecessary.

Figure 23:
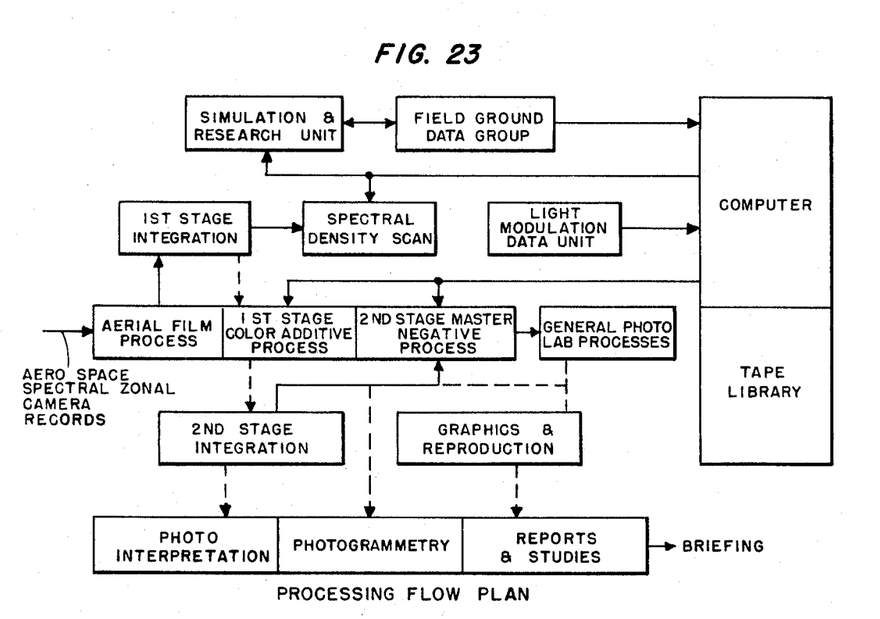
FIG. 23 is a flow diagram indicating the procedures used in a spectral zonal laboratory.
Figure 24:
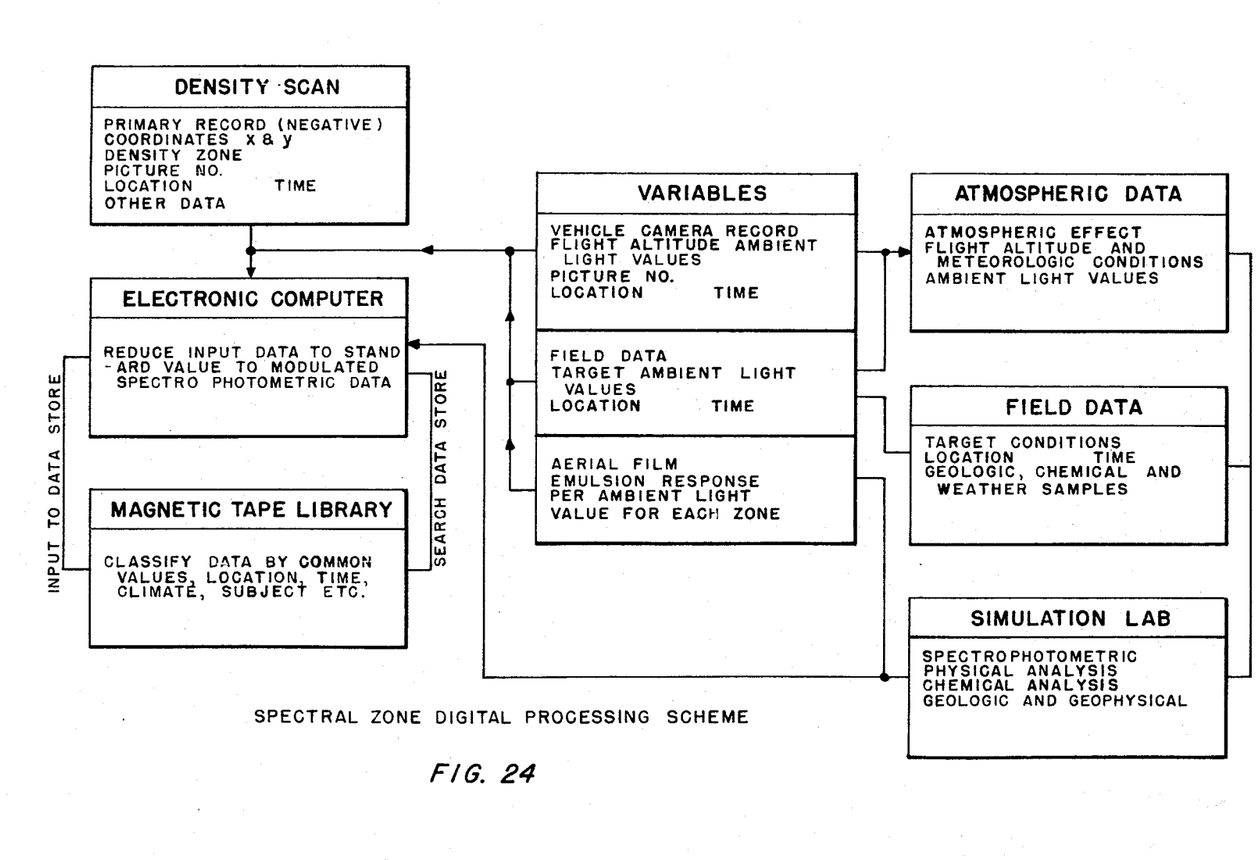
FIG. 24 is a block diagram indicating the digital processing procedure for the spectral zonal system.
Figure 25:
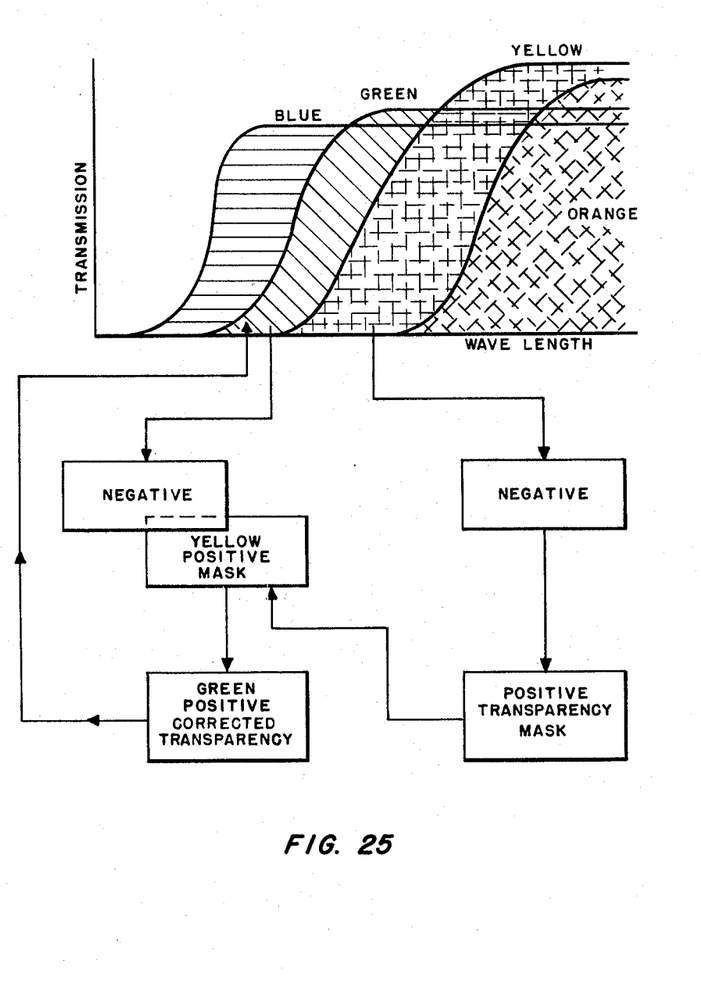
FIG. 25 is a graphical illustration depicting a typical example of the manner of utilization of subtractive type filters with the spectral zonal concepts of the instant invention.

FIGS. 23 and 24 are directed to a showing of the manner in which the instant inventive concepts lend to the overall operation of a spectral zonal laboratory and digital processing approach to photo intelligence interpretation techniques respectively.

The filters utilized for the practice of the inventive concepts of the instant invention may be of several types. The aforementioned interference type filters provide a preferred type of transmission and cutoff characteristics. This type of filter has been utilized in space capsules and as interference filters for microscope type applications. This type is frequently fabricated by applying coatings with layers of a transparent and of a reflective nature correlative to the desired passband so as to pass the desired band pass and attenuate undesired wave lengths of the ambient light spectrum. In appearance they are somewhat similar to the familiar blue coatings utilized to increase the transmission characteristics of optical elements by reducing flare and internal reflections in the lens system.

The interference type filter presents certain limitations in the operation of a system utilizing such filters, in that the lenses used for exposing the film in the camera must be of much narrower acceptance angle characteristics as compared to applications utilizing straight transmission filters.

The lenses are thus of long focal length with acceptance angles of the lens generally being limited to less than ten degrees.

The aforementioned straight transmission filters, on the other hand, permit usage of wide angle, short focal length lenses generally of considerably wider aperture characteristics as compared to the situation with respect to the interference type filters. Hence a wide angle lens of ninety degree acceptance angle characteristics for example as compared to a one degree acceptance angle of a long focus lens used with an interference filter, will permit in one pass with the aerial camera a data collection which might require up to one hundred passes with a camera using long focus lenses.

The usage of straight transmission filters, does however introduce certain differing techniques in handling and processing of the photographic materials in order to render this type filter of optimum usefullness in spectral zonal photographic applications.

A characteristic example of this technique is hereinafter set forth for a green subset filter of the straight transmission type, generally similar to the conventional Wrattan type filters.

The camera exposure for the green subset is obtained using a subtractive type filter interposed in the optical path of the objective lens which possess a band width of 50 millimicrons in the green and attenuates all beyond green as well as some green. Hence a yellow or green subtractive type filter would be used which transmitts yellow, orange, and red light.

Following exposure and development of the negative obtained from the aerial camera, the negatives obtained are printed by an unsharp mask technique to hold back the unsharp portion of the image resulting from light passed by the filters in near adjacent color bands which are not of the color desired to be printed as the critically sharp color image for the particular subset color of interest. Thus a holding back of the density difference between yellow and green in the proper proportion of yellow causes a cutoff on the far side of green, which, for example, will give only green. It is important that the proper amount of green imaging be printed. By using this green negative with a yellow filter, during this intermediate printing step, a transparency is obtained which is slightly unsharp as to the undesired portion of the adjacent color band. A yellow positive transparency is obtained from this procedural step which is thereafter utilized during an additional printing step for obtaining the desired green subset negative. This green subset negative is used for the integrations step with two other subset negatives for the set integration and as obtained by similar procedures with similarly selected filters for the required corrections, both in the camera and during processing of the intermediate positives, respectively into subset negatives.

The positive transparency print from the foregoing intermediate printing step is thus used as a mask to obtain the required green subset negative. In order to obtain a yellow subset negative for integration purposes, printing is accomplished with an orange filter and the positive transparency obtained thereby is coupled in a manner to provide the desired yellow band selectivity. This procedure is followed through to the use of deep red filters etc. in a manner deemed apparent to those skilled in the art.

The photographic materials utilized for the printing to the subset negative are spaced between the positive and negative by the addition of a transparent film medium of approximately 6 mils to 1/16 inch in thickness, in order to provide the desired unsharp imaging of unwanted images of colors outside the desired discrete band of light, while providing a sharp printing of the desired image. The Gaussian distribution effect which provides an unsharpness at the edges of the image to be printed functions to match up with the shorter wave lengths of light as recorded by the camera to eliminate all unwanted hard line characteristics in the printed image.

Obviously many modifications and variations of the present invention are possible in the light of the above teachings. It is therefore to be understood that within the scope of the appended claims the invention may be practiced otherwise than as specifically described.

What is claimed is:

1. A method of providing improved photo intelligence readout with a spectral zonal photo intelligence recording system comprising:
   a multi-camera unit aerial photo recording apparatus characterized by an objective lens assembly individual to each individual camera unit;
   each of the objective lens thereof having mutually different critical sharpness characteristics for a discrete and mutually differing color pass band and further including in each optical path between the object and objective lens a film plane thereof for film exposure;
   optical filter means individual to each camera unit lens, said filter means providing attenuation of portions of the light spectrum in color bands for substantially all colors other than the color for which the lens immediately associated therewith is intended to pass;
   said method comprising the steps of:
   exposing a plurality of at least nine individual films for negative record images of desired target-object intelligence with one each from one of at least nine of the plurality of camera units, through the filter means operatively associated with the particular objective lens individual to each particular camera unit;
   developing the individual exposed films;
   printing a composite positive from at least three individual and different groups of three different negatives to provide a first integration of the recorder intelligence in image form carried by the film negatives;
   printing from at least three composite positive transparencies as obtained from the immediately preceding step, a plurality of at least three composite negatives for providing a second integration of the image intelligence recorded on said positive transparencies; and
   printing a positive transparency and/or print from tthe negative provided by said immediate preceding step.

2. The method of claim 1, further characterized by the additional step of providing a densitometric scanning of the image carried by at least said transparencies as obtained by the final step thereof:
   converting amplitude variations of density in said transparency and/or transparencies as the case may be, into electrical signals indicative of predetermined degrees of change in density;
   digitizing the electrical signals thus obtained in a manner suitable for application to a digital storage medium and/or digital computer.

3. The method of claim 2, further characterized by the additional steps of:
   applying the digital electrical outputs thus obtained to a digital computer, as required from the values obtained by spectrodensitometric analysis of one or more of said exposed film images, and;
   reprocessing films to provide the required corrections.

4. The method of claim 3, further comprising the steps of, comparing a similarly obtained digital computation for an ambient light spectral distribution record as obtained during the same time period as utilized for the exposures in said multi-camera units, with the digital readout previously obtained;
   providing an additional correction digital readout correlating the results of said comparison step, and;
   applying the digitized electrical output thus obtained in a manner to control the intensity level of light illumination as utilized for the exposure and processing of additionally corrected film image mediums.

5. The method of claim 4, further characterized by viewing the film image mediums as obtained following the final correction steps, in a rear projection viewer.

6. The method of claim 5, further characterized by subjecting the beam path between the illuminated transparencies and the rear projection viewer screen to interferometric image enhancement by the interpositioning of an interferometer in said beam path whereby the beam path is divided in advance of, and substantially reunited at, the rear projection screening surface.

References Cited

UNITED STATES PATENTS

| | | | |
|---|---|---|---|
| 653,380 | 7/1900 | Davidson | 95—12.20 |
| 1,187,884 | 6/1916 | Brigden | 95—12.20 |
| 2,909,097 | 10/1959 | Alden | 95—12.20 X |

JOHN M. HORAN, *Primary Examiner.*